United States Patent
Strom

(10) Patent No.: US 6,295,719 B1
(45) Date of Patent: Oct. 2, 2001

(54) COMPRESSIVE STRESS TREATMENT METHOD FOR CONTROLLING CURVATURE OF A HYDRODYNAMIC BEARING SLIDER

(75) Inventor: Richard A. Strom, Eagan, MN (US)

(73) Assignee: Seagate Technology LLC, Scotts Valley, CA (US)

( * ) Notice: Subject to any disclaimer, the term of this patent is extended or adjusted under 35 U.S.C. 154(b) by 0 days.

(21) Appl. No.: 09/562,830

(22) Filed: May 1, 2000

Related U.S. Application Data

(62) Division of application No. 08/662,849, filed on Jun. 12, 1996, now Pat. No. 6,073,337.

(51) Int. Cl.[7] ................................................. G11B 5/127
(52) U.S. Cl. .................................... 29/603.12; 29/898.13; 29/603.16; 219/121.85
(58) Field of Search ............................ 29/603.12, 603.16, 29/898.13, 898.02, 898.1; 360/106, 103, 104; 219/121.6, 121.66, 121.85

(56) References Cited

U.S. PATENT DOCUMENTS

| | | |
|---|---|---|
| 4,910,621 | 3/1990 | Matsuda et al. ...................... 360/104 |
| 5,057,184 | * 10/1991 | Gupta et al. .......................... 156/637 |
| 5,156,704 | 10/1992 | Kemp .................................... 156/655 |
| 5,220,471 | 6/1993 | Matsuzaki ............................. 360/103 |
| 5,237,476 | 8/1993 | Bischoff et al. ...................... 360/126 |
| 5,256,850 | 10/1993 | Maegawa et al. ............... 219/121.69 |
| 5,266,769 | 11/1993 | Deshpande et al. ............ 219/121.69 |
| 5,303,105 | 4/1994 | Jorgenson ............................ 360/106 |
| 5,442,850 | 8/1995 | Kerth ..................................... 29/603 |
| 5,995,335 | * 11/1999 | Jurgenson et al. .................... 360/109 |

OTHER PUBLICATIONS

Photograph of TDK TPC ABS slider from Quantum Fireball 2 Drive, publicly on sale at least as early as Jan. 1, 1996.

Photograph of TDK AAB slider from Pike Disc Drive, publicly on sale at least as early as Jan. 31, 1996.

* cited by examiner

Primary Examiner—David P. Bryant
Assistant Examiner—Marc W. Butler
(74) Attorney, Agent, or Firm—Westman, Champlin & Kelly, P.A.

(57) ABSTRACT

A method of controlling curvature of hydrodynamic bearing slider. The method includes adding a preselected amount of compressive surface stress to the slider to change curvature of the slider and then removing a portion of the added compressive stress to adjust the curvature.

4 Claims, 8 Drawing Sheets

- ROW SLICE

- STRESS RELIEVE – 2 SIDES BY LASER HEAT TREATMENT (LHT)

- ADD 2 LONGITUDINAL SCRATCHES TO ADJUST CROWN

- BAR MOUNT NEGLIGIBLE CURVATURE CHANGE

- FINISH LAP – FLAT

- DISMOUNT NEGLIGIBLE CURVATURE CHANGE

- LHT BACK SIDE – REMOVE SCRATCH STRESS

COMPRESSIVE STRESS TREATMENT METHOD FOR CONTROLLING CURVATURE OF A HYDRODYNAMIC BEARING SLIDER

CROSS-REFERENCE TO RELATED APPLICATIONS

This application is a division of U.S. application Ser. No. 08/662,849, which was filed on Jun. 12, 1996 and issued as U.S. Pat. No. 6,073,337.

Cross reference is also made to U.S. application Ser. No. 08/910,729, filed Aug. 13, 1997 and issued as U.S. Pat. No. 5,982,583 and to U.S. application Ser. No. 09/546,836, filed Apr. 11, 2000.

BACKGROUND OF THE INVENTION

The present invention is related to disc drive data storage systems and, more particularly, to a method of controlling curvature of a hydrodynamic bearing slider.

Disc drives of the "Winchester" type are well known in the industry. Such drives use rigid discs coated with a magnetizable medium for storage of digital information in a plurality of circular, concentric data tracks. The discs are mounted on a spindle motor which causes the discs to spin and the surfaces of the discs to pass under respective head gimbal assemblies (HGAs). Head gimbal assemblies carry transducers which write information to and read information from the disc surface. An actuator mechanism moves the head gimbal assemblies from track to track across the surfaces of the discs under control of electronic circuitry. The actuator mechanism includes a track accessing arm and a load beam for each head gimbal assembly. The load beam provides a preload force which urges the head gimbal assembly toward the disc surface.

The head gimbal assembly includes a hydrodynamic (e.g. air) bearing slider and a gimbal. The gimbal is positioned between the slider and the load beam to provide a resilient connection that allows the slider to pitch and roll while following the topography of the disc. A slider includes a slider body having an air bearing surface which faces the disc surface. As the disc rotates, the disc drags air under the slider along the air bearing surface in a direction approximately parallel to the tangential velocity of the disc. Skin friction on the air bearing surface causes the air pressure between the disc and the air bearing surface to increase which creates a hydrodynamic lifting force that causes the slider to lift and fly above the disc surface. The preload force supplied by the load beam counteracts the hydrodynamic lifting force. The preload force and the hydrodynamic lifting force reach an equilibrium based upon the hydrodynamic properties of the slider and the speed of rotation of the disc. The transducer is typically mounted at or near the trailing edge of the slider.

Flying height is viewed as one of the most critical parameters of contact and non-contact recording. As the average flying height of the slider decreases, the transducer achieves greater resolution between the individual data bit locations on the disc. Therefore, it is desirable to have the transducers fly as close to the disc as possible. Flying height is preferably uniform regardless of variable flying conditions, such as tangential velocity variation from inside to outside tracks, lateral slider movement during seek operations and air bearing skew angles.

In certain applications, it is desirable to fabricate the slider such that the bearing surface has a positive curvature along the length and width of the slider. Length curvature is known as crown curvature. Width curvature is known as camber or cross curvature. The proper setting and control of length and width curvature improves flying height variability over varying conditions, improves wear on the slider and the disc surface, and improves takeoff performance by reducing stiction between the slider and the disc surface. In a typical slider fabrication process, length or width curvature is created by lapping the bearing surface on a cylindrically-shaped lapping surface or on a flat lapping surface while rocking the slider body back and forth in the direction of the desired curvature. The amount of curvature is determined by the radius of the rocking rotation. This lapping process is difficult to control and results in large manufacturing tolerances. More efficient and controllable methods of effecting air bearing surface curvature are desired.

U.S. Pat. No. 5,442,850 discloses inducing a preselected amount of compressive stress within a selected section of the bearing surface by impinging the section with a plurality of particles for a preselected amount of time. U.S. Pat. No. 4,910,621 discloses a method of producing curvature in a slider by creating a groove in the leading edge of the slider, placing a sealing material in the groove and then melting and stiffening the sealing material in the groove. The sealing material has an adhesive property upon melting and a shrinking property upon stiffening which causes lengthwise curvature at the leading edge of the slider. U.S. Pat. No. 5,220,471 discloses a slider having a longitudinal linear groove in a surface which is opposite the disc-opposing surface. The groove creates tensile stresses which cause the disc-opposing surface of the slider to be a curved surface in a convex form.

SUMMARY OF THE INVENTION

In one aspect of the present invention, curvature of a hydrodynamic bearing slider is controlled by first adding a preselected amount of compressive surface stress to the slider body to change the curvature and then removing a portion of the added compressive stress to adjust the curvature.

The compressive stress can be applied to the bearing surface or to the back surface of the slider. Compressive stress added to the bearing surface directly results in a positive curvature of the bearing surface such that the bearing surface has a convex shape. When the compressive stress treatment is applied to the back surface of the slider, the compressive stress causes the bearing surface to become concave, as opposed to convex. The bearing surface is then lapped flat, and a portion of the added compressive stress is removed from the back surface, which causes the bearing surface to have a controlled convex shape.

In another aspect of the present invention, curvature is controlled by lapping the back surface to add uniform compressive stress in the back surface, then flat lapping the bearing surface, and then removing the added compressive stress in the back surface to change curvature of the bearing surface into a convex shape.

In yet another aspect of the present invention, curvature is controlled by selecting an area on the slider and thermally relaxing the area to controllably remove compressive surface stress. The change in curvature can be controlled by raster scanning a pulsed beam of laser light over the selected area at a selected pitch or in a selected geometric pattern.

DETAILED DESCRIPTION OF THE PREFERRED EMBODIMENTS

Figure 1:
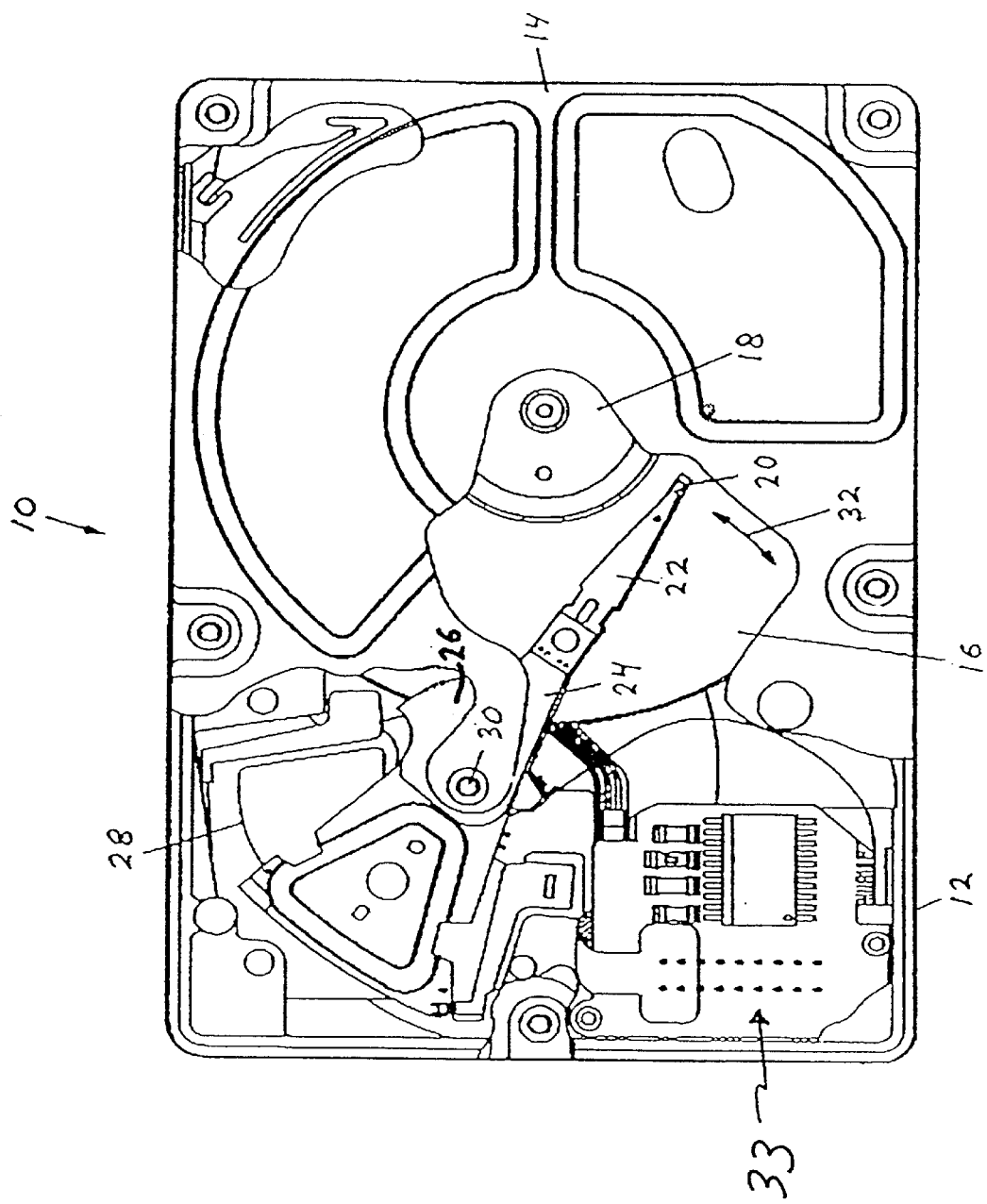
FIG. 1 is a plan view of a typical disc drive in which a hydrodynamic bearing slider fabricated according to the present invention is useful.

FIG. 1 is a plan view of a typical disc drive 10 in which a hydrodynamic bearing slider fabricated according to the present invention is useful. Disc drive 10 includes a housing with a base 12 and a top cover 14 (portions of top cover 14 are removed for clarity). Disc drive 10 further includes a disc pack 16 which is mounted on a spindle motor (not shown) by a disc clamp 18. Disc pack 16 includes a plurality of individual discs which are mounted for co-rotation about a central axis. Each disc surface has an associated head gimbal assembly (HGA) 20 which is mounted to disc drive 10 for communicating with the disc surface. In the example shown in FIG. 1, HGAs 20 are supported by load beam flexures 22 which are in turn attached to track accessing arms 24 of an actuator 26. The actuator shown in FIG. 1 is of the type known as a rotary moving coil actuator and includes a voice coil motor (VCM), shown generally at 28. Voice coil motor 28 rotates actuator 26 with its attached heads 20 about a pivot shaft 30 to position heads 20 over a desired data track along an arcuate path 32 under the control of electronic circuitry 33.

Figure 2:
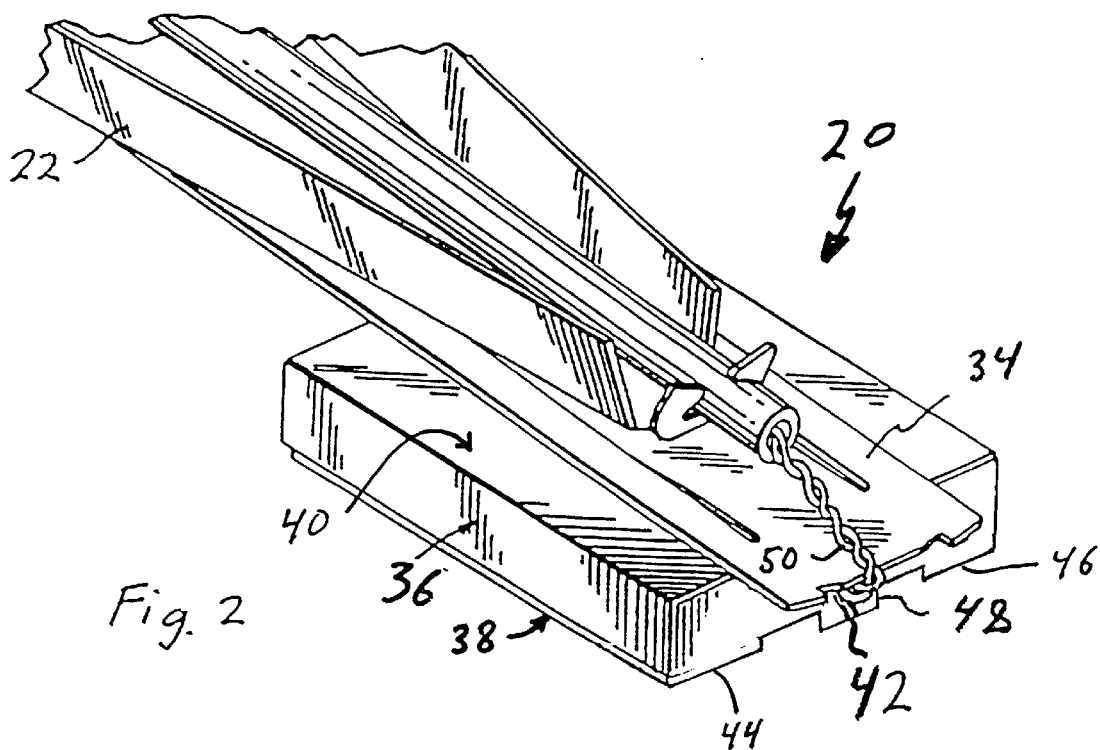
FIG. 2 is a perspective view of head gimbal assembly supported by a load beam flexure.

FIG. 2 shows head gimbal assembly 20 in greater detail. Load beam 22 provides a preload force which urges head gimbal assembly 20 toward the disc surface. Assembly 20 includes a gimbal 34 and a slider 36. Gimbal 34 is positioned between slider 36 and load beam 22 to provide a resilient connection that allows the slider to follow the topography of the disc. Slider 36 includes air bearing surface 38, back surface 40 and transducer 42. Bearing surface 38 includes first and second raised side rails 44 and 46 and raised center pad 48. Transducer 42 is fabricated on a trailing end of center pad 48. Transducer 42 is electrically coupled to leads 50. Transducer 42 communicates with individual bit positions on the surface of disc 16 as they pass beneath slider 36. Transducer 42 can include a thin film or a magnetoresistive magnetic head, for example.

Figure 3:
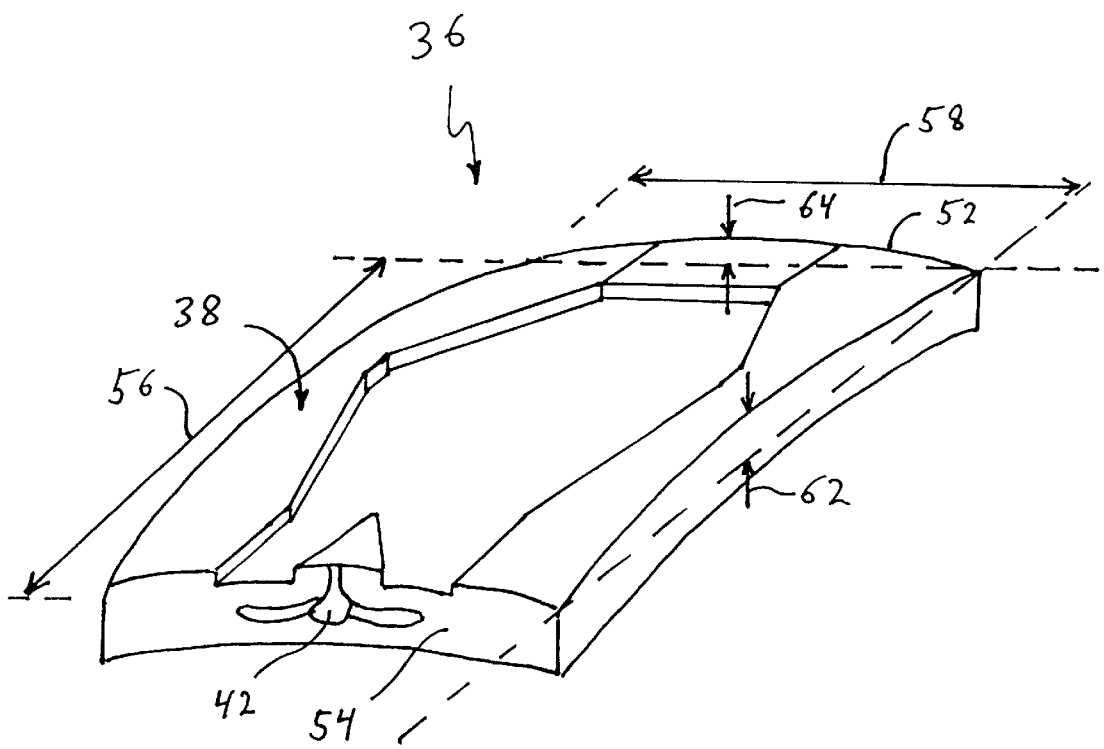
FIG. 3 is a perspective view of a slider having a bearing surface with a length and width curvature.

FIG. 3 is a perspective view of slider 36, as viewed from bearing surface 38. Slider 36 has a leading surface 52, a trailing surface 54, a length 56 and a width 58. Slider 36 preferably has a positive curvature along length 56 and along width 58. With a positive curvature, air bearing surface 38 has an overall convex shape. A common measurement of the length curvature and the width curvature is the difference between the highest point along the length and width and the lowest point along the length and width, respectively. The height difference along the length curvature ("crown height") is shown at 62. The height difference along the width curvature ("cross height") is shown at 64. Typical crown and cross heights are on the order of zero to 1.5 microinches for a "30 series" slider having a length of 49 mils and a width of 39 mils.

Figure 4A:
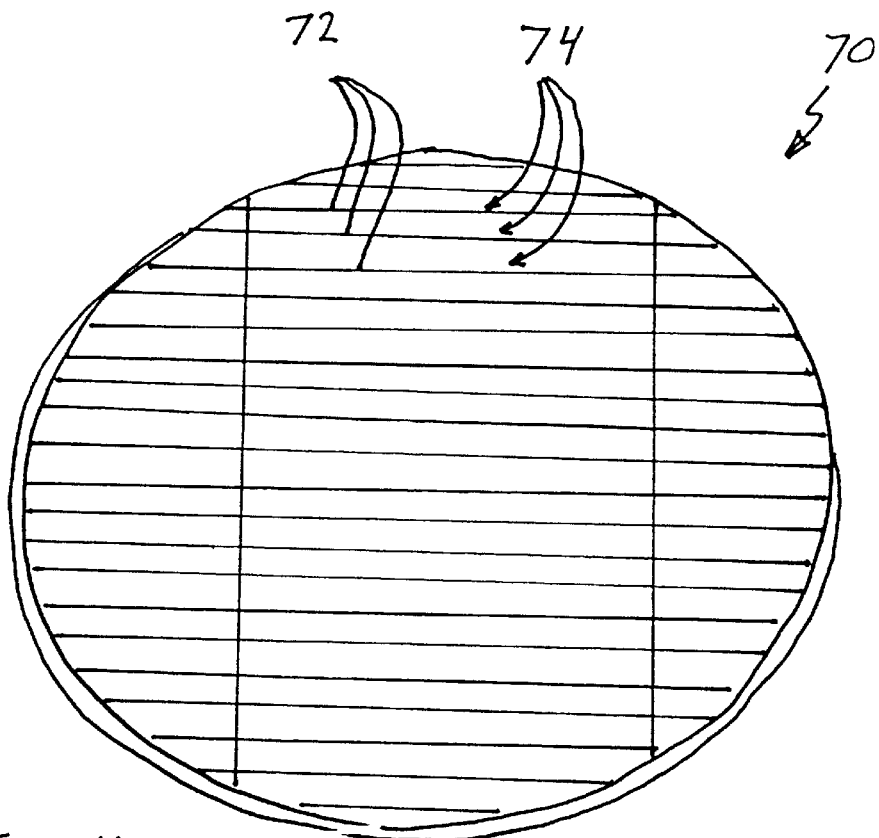
FIG. 4A is a perspective view of a wafer from which the slider shown in FIG. 3 is formed.
Figure 4B:
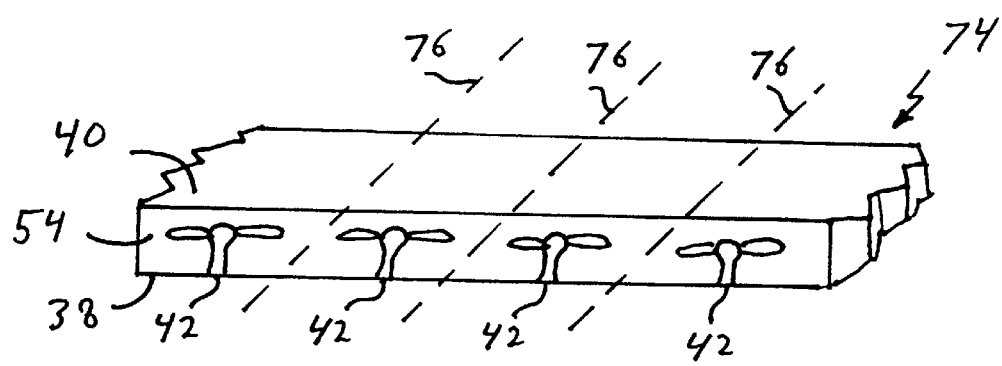
FIG. 4B is a fragmentary perspective view of a bar of sliders sliced from the wafer shown in FIG. 4A.

The length curvature and the width curvature are formed during fabrication of the slider body. The slider body is formed from a substrate known as a wafer. FIG. 4A is a perspective view of a typical wafer 70. A matrix of transducers (not shown) is applied to the top surface of wafer 70. Wafer 70 is then sliced along rows 72 into a plurality of bars 74. Each bar 74 includes a plurality of individual slider bodies, with each slider body having a corresponding transducer 42 as shown in FIG. 4B. The sliced surfaces become bearing surface 38 and back surface 40, while the top surface of wafer 70 becomes trailing surface 54 of each slider body. The slicing process induces non-uniform surface stress in bearing surface 38 and back surface 40 due to plastic deformation of the surfaces. This surface stress is typically compressive.

Once wafer 70 has been sliced into individual bars 74, the bearing surface 38 of each bar is machined by a lapping process prior to forming the air bearing features. The lapping process is controlled to obtain a target throat height for each transducer 42. The throat heights are preferably uniform for each transducer in the bar. However, if the bar is not uniformly flat prior to the lapping process, but includes some waviness, a twist or a bow due to the non-uniform compressive surface stress formed by the slicing process, it is difficult, if not impossible, to control the lapping process to achieve a uniform throat height. Once bars 74 are lapped flat, each bar 74 is diced along a plurality of dice lanes 76 into the plurality of individual slider bodies. The slicing and dicing operations are typically performed with a diamond-tipped saw blade.

Figure 5A:
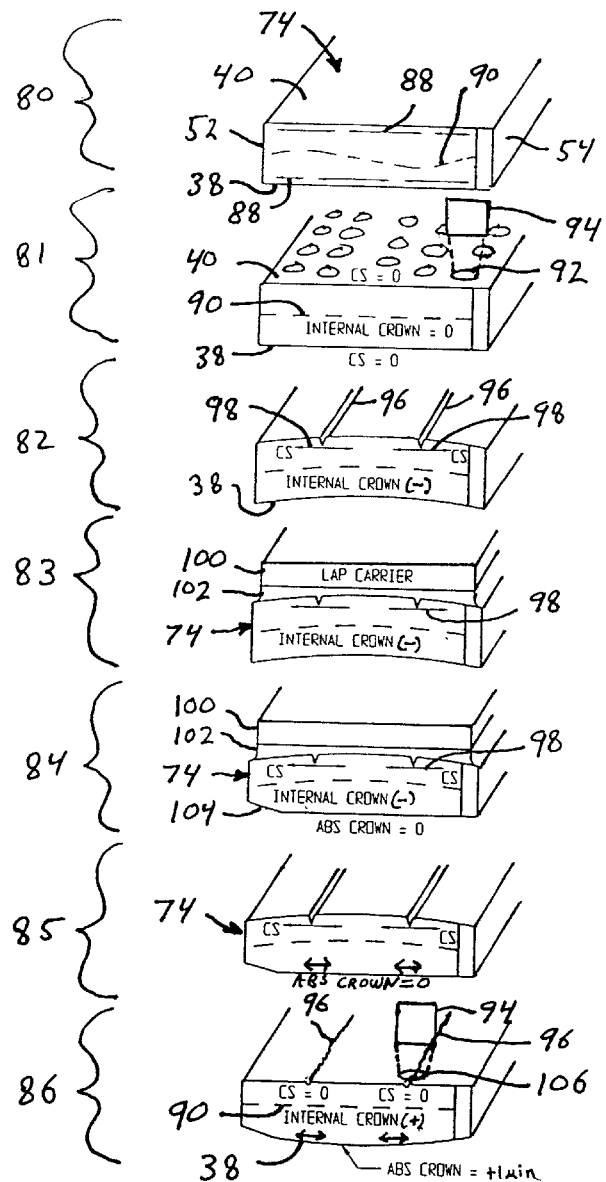
FIG. 5A is a flow chart which illustrates a slider fabrication process of the present invention.

FIG. 5A is a flow chart which illustrates a slider fabrication process of the present invention, which stress relieves the bar prior to lapping and induces an accurately controlled positive curvature in bearing surface 38. FIG. 5A includes an end view of bar 74 after each process step 80–86. At step 80, bar 74 is shown after it is formed by a row slice operation. Arrows 88 represent compressive surface stress induced in the air bearing surface 38 and the back surface 40 by the row slice operation. The varying length of arrows 88 illustrate the non-uniform nature of the compressive surface stress. The non-uniform stress results in a non-uniform internal crown 90 from leading surface 52 to trailing surface 54.

At step 81, bearing surface 38 and back surface 40 are stress relieved by thermal surface relaxation. Thermal surface relaxation relieves stress in the surface by melting or vaporizing the stressed material. In one embodiment, the bulk material of bar 74 includes aluminum oxide and titanium carbide, which has a very high melting point (>2000° C.). The transducer mounted to the bulk material has a damage temperature of about 150° C. Therefore, thermal relaxation treatment should be localized to the bearing surface and the back surface.

In the embodiment shown in FIG. 5A, thermal surface relaxation is performed through laser heat treatment. A beam of laser light 92 is directed from a YAG laser 94 toward bearing surface 38 and back surface 40. The laser heat treatment applies radiation to the surface in the form of a high peak, short duration photon energy pulse which can be raster scanned over surfaces 38 and 40 to melt and restructure a thin surface layer (about 2 µm deep) of the material on each surface without significantly increasing the temperature of the bulk material. This is referred to as "blanket" laser heat treatment. In one embodiment, laser spot 92 has a diameter of about 40 µm.

The melting and restructuring of the stressed material is believed to reduce or eliminate the compressive stresses that have been applied on the surface by plastic deformation, such as by scratching, lapping or grinding. It has been found that a melting depth of 0–3 µm is sufficient to remove the compressive stresses left by prior machining operations. This also results in a near zero internal crown 90. The laser spot energy density and the pulse duration are preferably adjusted to give adequate surface melting without removing any material. In an alternative embodiment, stress is relieved with higher energies that result in material vaporization. The laser heat treatment is shown in greater detail in FIG. 5B, which is discussed below.

Any other method of removing or reducing compressive surface stress can also be used with the present invention. For example, compressive surface stress can be removed by removing the stressed or plastically deformed material, such as by fine lapping, ion milling or etching. Thermal surface relaxation or material removal by vaporization or ablation can be done by using lasers other than a pulsed YAG laser and by energy beam configurations other than small diameter scanning spots. $CO_2$ lasers and Eximer lasers are other examples of lasers that could be used. Also, a continuous wave laser beam can be used instead of a pulsed beam. These lasers have different wavelength energies and different beam characteristics which may be advantageous in specific applications and on specific materials.

Selectively relieving compressive surface stress by laser heat treatment or other methods causes a curvature change in bar 74 and in individual slider bodies within the bar. For example, in the blanket laser heat treatment, the spot density (spot spacing and scan pitch) can be altered to selectively control the amount of curvature change in the length and width directions at individual slider sites on bar 74. The laser heat treatment can also be applied in only selected areas or in a selected pattern to achieve a desired curvature change. For example, laser heat treatment can be applied in an asymmetrical pattern to control twist of bar 74.

At step 32, one or more scratches (or score segments) 96 are formed in the back surface 40 to cause a plastic deformation of the material in back surface 40. Virtually no material is removed. The plastic deformation adds a preselected amount of directional compressive surface stress 98 to back surface 40 which effects a negative change in the internal crown of bar 74 and in the length curvature of air bearing surface 38, which causes the air bearing surface to become concave. In one embodiment, scratches 96 are formed by a diamond pointed tool which is pressed into and drawn across back surface 40 in the width direction of each slider body in bar 74. It has been found that a properly positioned line segment of directional compressive stress is useful for controlling or adjusting the curvature of air bearing surface 38. The amount of curvature change is a function of the length of each scratch, the number of scratches, the direction of each scratch, the depth of each scratch and the force applied during scratching. Each of these parameters can be adjusted as desired to obtain a particular curvature change on bearing surface 38. In one embodiment, each scratch has a width of 10 µm and a depth of 1.0 µm. In an alternative embodiment, scratches 96 are oriented along the length of each slider body within bar 74 to effect a change in the width curvature of bearing surface 38.

At step 83, bar 74 is mounted to a lapping carrier 100 with an adhesive 102. Adhesive 102 is preferably flexible such that bar 74, and thus each slider body within the bar, is held in a relaxed state with little or no change in curvature caused by the adhesive.

At step 84, bar 74 is lapped flat such that air bearing surface 38 has a length curvature (labeled "ABS CROWN") of zero. However, bar 74 still has a negative internal crown due to the compressive stress 98 in back surface 40. Also, a leading edge taper 104 is lapped into air bearing surface 38. It has been found that good control and repeatability depends upon the ability of the mounted bar to relax in bonding adhesive 102 while the pre-existing surface stresses on the air bearing surface 38 are changing as the lapping progresses to the final state.

At step 85, bar 74 is dismounted from lap carrier 100 with negligible curvature change. The compressive stress in the lapped air bearing surface 38 is relatively low.

At step 86, a portion of the added compressive stress is selectively removed or "erased" from back surface 40 to achieve a desired length curvature on bearing surface 38. Erasing the added compressive stress results in a controlled change of the length curvature (or crown) of bearing surface 38, which becomes convex. In a preferred embodiment, the added compressive stress is erased by selectively heat treating scratches 96, with a beam of laser light 106 from YAG laser 94. The laser erase can be applied as a blanket adjustment along the entire bar 74 or as a separate adjustment for each slider either before or after being diced into individual slider bodies. Reducing or removing the added compressive stress on back surface 40 results in a slightly positive internal crown 90 and a positive crown height of approximately +1 microinch, for example, on bearing surface 38.

The process illustrated in FIG. 5A can be adjusted to control width curvature by applying scratches 96 in the length direction, as opposed to the width direction. It has been found that the curvature adjustment of one slider body in a bar has little or no effect on the curvature of adjacent slider bodies. The process steps shown in FIG. 5A allow the length and width curvature adjustments to be moved earlier in the fabrication process to the bar level which results in greater efficiency and reduced process variation from one slider to the next.

Figure 5B:
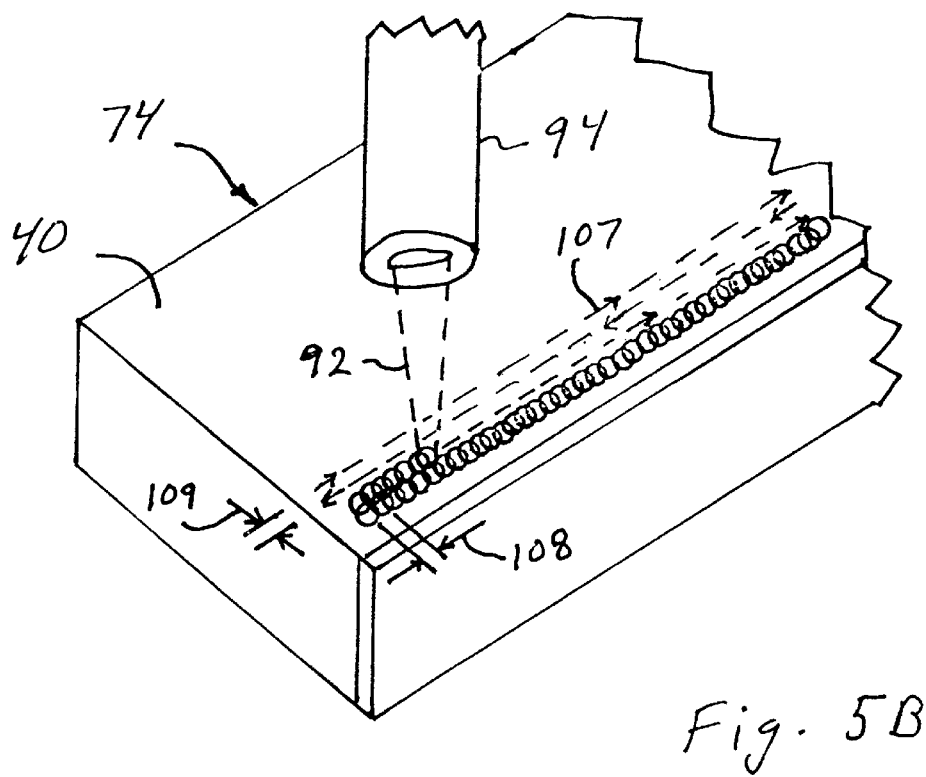
FIG. 5B is a perspective view of the bar shown in FIG. 4B which illustrates a blanket laser heat treatment.

FIG. 5B is a perspective view of bar 74 which illustrates the blanket laser heat treatment that is performed at step 81 in FIG. 5A. YAG laser 94 directs pulsed laser spot 92 toward back surface 40 of bar 74. YAG laser 94 raster scans laser spot 92 over back surface 40 of bar 74 in the directions indicated by arrows 107. In a preferred embodiment, with a spot diameter of about 40 µm, the scan pitch and spot spacing is adjusted such that laser spot 92 has a spot spacing 108 of 5 µm to 500 µm and laser spot 92 preferably has a scan pitch 109 of 5 µm to 1000 µm.

Figure 6:
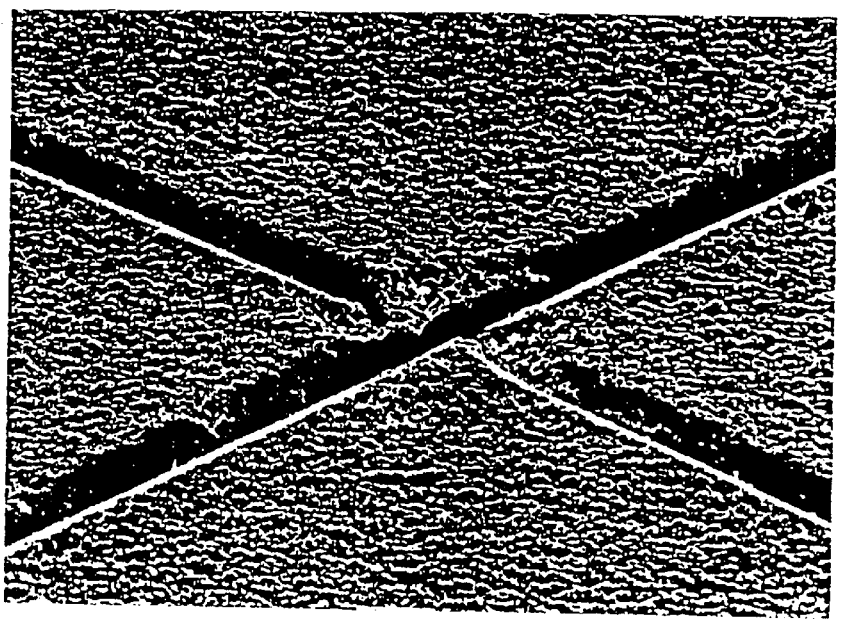
FIG. 6 is a magnified view of scratch lines applied to the bar in the length and width directions.

FIG. 6 is a magnified view of scratch lines 96 applied in the length and width directions at step 82 of FIG. 5A before laser heat treatment at step 86. In FIG. 6, scratch lines 96 are magnified 1,670 times.

Figure 7A:
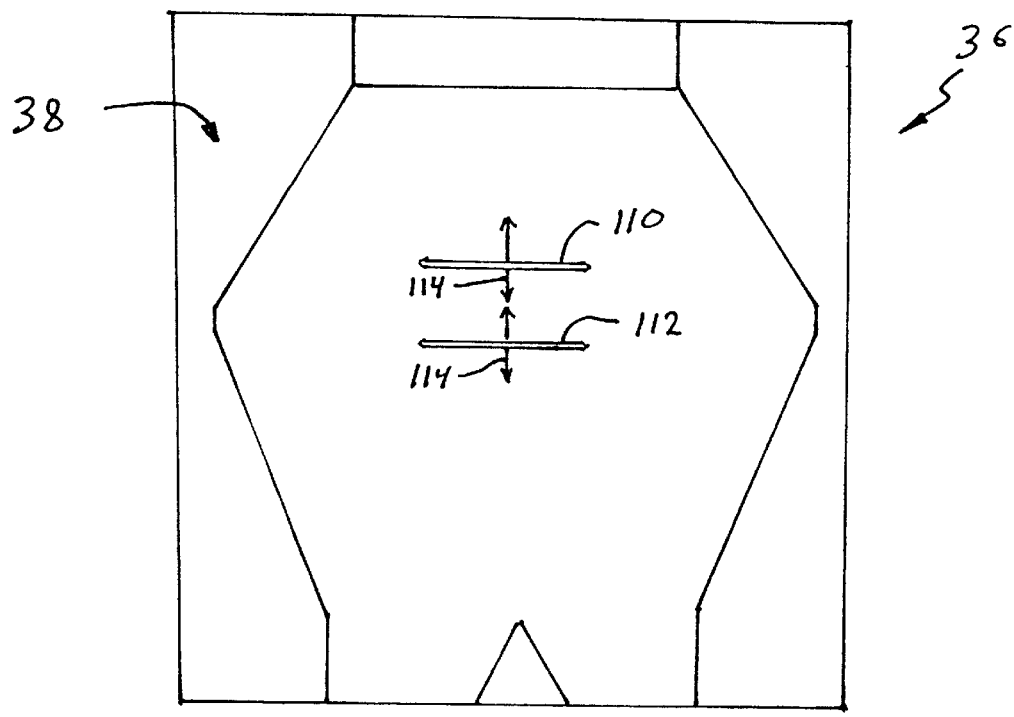
FIGS. 7A and 7B illustrate stress treatment on the air bearing surface.
Figure 7B:
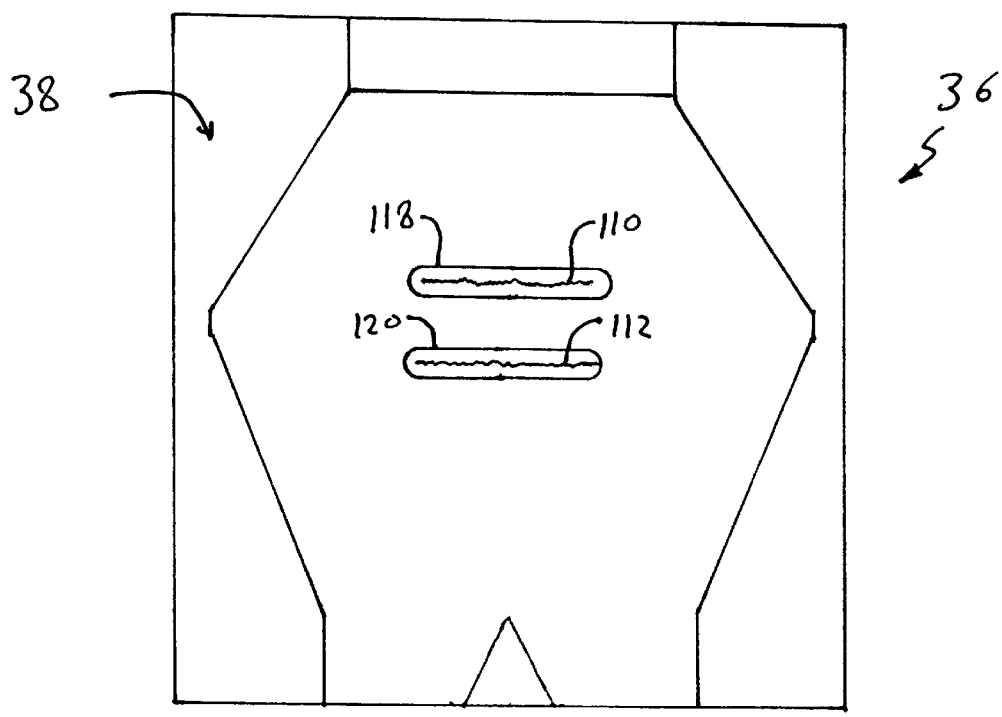

In an alternative embodiment, curvature of air bearing surface 38 is controlled by stress treatment on air bearing surface 38, as opposed to back surface 40. FIGS. 7A and 7B illustrate stress treatment on the air bearing surface 38. In FIG. 7A, scratch lines 110 and 112 are applied to bearing surface 38 in the width direction to induce compressive surface stress 114 in the length direction. The induced stress creates a positive length curvature in bearing surface 38. In one example, scratch lines 110 and 112 resulted in a length curvature of about +0.71 microinches. FIG. 7B illustrates slider 36 after laser heat treatment. Bearing surface 38 has been heat treated in areas 118 and 120 to partially remove the added compressive stress induced by scratch lines 110 and 112. After heat treatment, the length curvature reduced from 0.71 microinches to 0.40 microinches. The scratch lines and laser heat treatment can also be applied in the length direction to control curvature of air bearing surface 38 in the width direction. The laser heat treatment can be applied to the entire scratch lines or to portions of the scratch lines based on a curvature measurement of each slider. In this way, a precise curvature can be achieved by a trimming adjustment.

Figure 8:
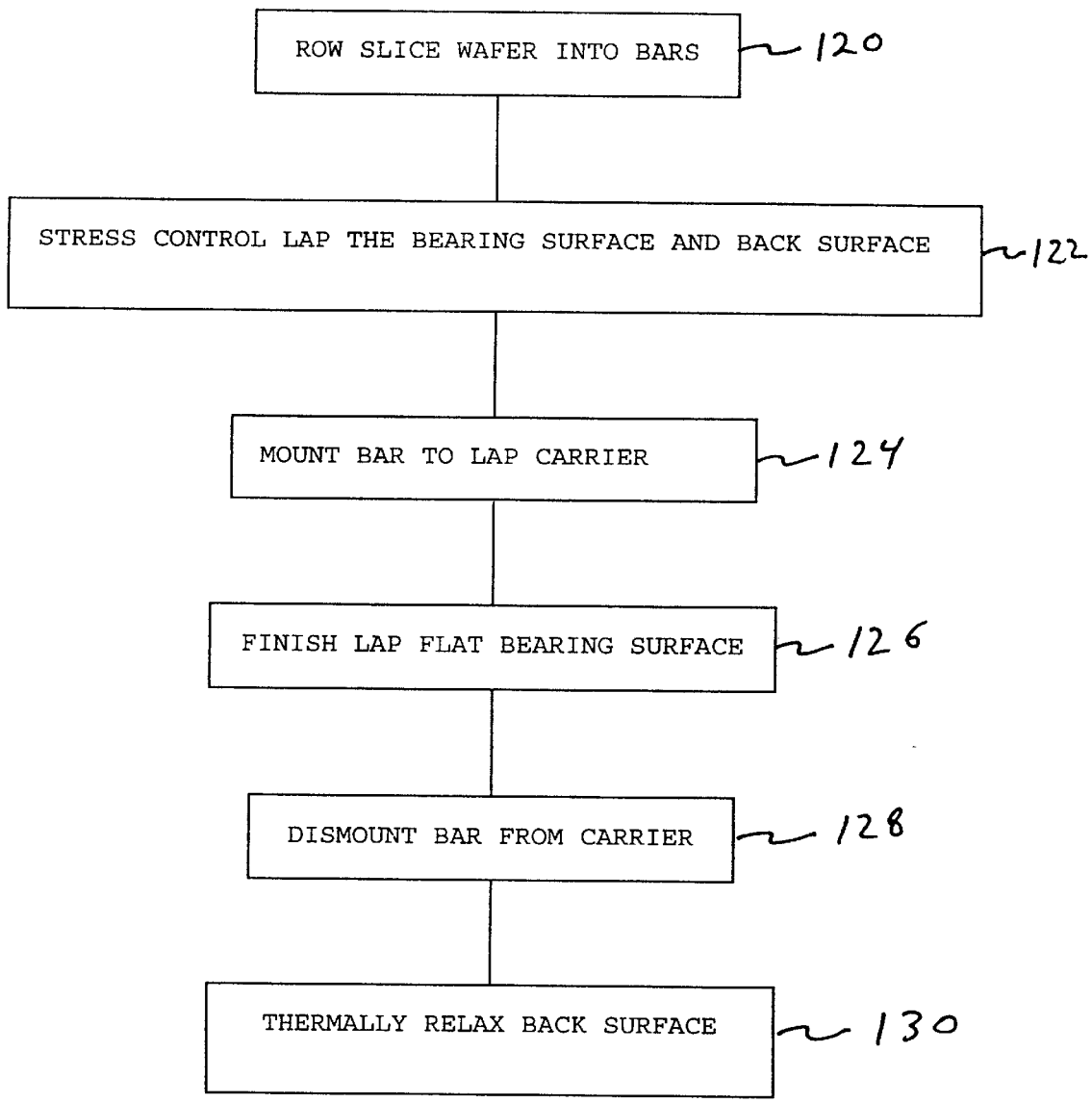
FIG. 8 is a flow chart which illustrates a slider fabrication process of an alternative embodiment of the present invention.

In another alternative embodiment, slider 36 has its curvature controlled or adjusted without adding compressive stress through scratch lines, as shown in the flow chart of FIG. 8. The wafer is sliced into a plurality of bars, at step 120. At step 122, the bearing surface and the back surface of the bar are given a stress control lapping treatment. This can be a free bar batch lapping process, a double disc (two-sided) lapping process, a vertical grinding operation or any other surface stress treatment. The lapping treatment reduces or eliminates the compressive surface stress created by the slicing process at step 120 and leaves it with a more uniform, compressive surface stress. This more uniform compressive surface stress can be added with a directional or a random scratch in the lapping process. The bar is then mounted to a flat lap bar carrier, at step 124. At step 126, the bearing surface is lapped flat with a finer finishing lapping process. The finer lapping process further reduces the compressive surface stress on the bearing surface. The bar is dismounted from the lapping carrier, at step 128. At step 130, the back surface is thermally relaxed to remove the compressive stress added by the lapping treatment at step 122. Thermal relaxation of the back surface can cover the entire back surface or can be applied in a selected pattern. Removing the compressive surface stress from the back surface allows the back surface to relax, resulting in a positive curvature on the air bearing surface. Other stress reducing treatments can also be used, such as ion milling and etching. A positive, well-controlled length curvature of about 0.8 microinches, for example, can be achieved by the process shown in FIG. 8. In yet another alternative embodiment, the bearing surface and the back surface are thermally relaxed, such as with laser heat treatment, after step 120 to remove the compressive surface stress created by the slicing process. This results in a flat or near zero curvature.

The stress removal treatment of the present invention can also be used to achieve greater control over the throat height of the recording transducers, independently of air bearing curvature control, by controlling bar bow prior to the lapping process. As mentioned with reference to FIG. 4B, if the bar is not uniformly flat prior to the lapping process of the bearing surface, but includes some waviness, a twist or a bow, it is difficult to control the lapping process to achieve a uniform throat height since the various transducers along the bar are lapped to different depths. A non-uniformity in throat heights significantly changes the read and write characteristics from one transducer to the next and therefore increases tolerances and decreases the fabrication yield. The stress removal treatment methods discussed above, such as laser heat treatment, ion milling and etching can be used to remove compressive surface stress from the back and bearing surfaces and thereby improve bar flatness prior to lapping the bearing surface. As a result, the bearing surface and thus the transducers are lapped more uniformly which results in a more uniform throat height.

In summary, the compressive stress treatment method of the present invention allows accurate control of bar bow and air bearing surface curvature at the bar level. fabrication process or at the slider level fabrication process. Compressive surface stress which comes from traditional cutting and working processes is a major factor affecting bar and slider flatness. Laser heat treatment and other thermal surface relaxation processes are effective tools for controlling or adjusting these stresses to reduce bar bow and achieve the final air bearing surface curvature of a slider. Curvature can further be controlled by adding a preselected amount of directional compressive surface stress through plastic deformation and then adjusting the added stress by heat treatment. Compressive stress curvature control can be moved from the air bearing surface to the back surface by adding the compressive stress to the back surface prior to the lapping process. Once the lapping process is complete, the added compressive stress on the back surface is completely or partially removed by a stress removal treatment which results in a positive curvature on the air bearing surface. The stress removal treatment can be performed with a laser or by any other thermal relaxation process. In one embodiment, the laser is controlled by a programmed computer which can provide "digital" or step wise control of individual slider air bearing curvature as opposed to the "analog" control achieved by physically work stressing to surface. Also, the compressive surface stress can be added in a number of ways, in addition to scratching the slider surface. Compressive surface stress can be added by grinding, lapping or otherwise working the surface to create controlled plastic deformation.

Although the present invention has been described with reference to preferred embodiments, workers skilled in the art will recognize that changes may be made in form and detail without departing from the spirit and scope of the invention.

What is claimed is:

1. A method of controlling curvature of a hydrodynamic bearing slider, the method comprising:

selecting a surface area on the slider;

directing a continuous-wave laser beam toward the surface area; and scanning the continuous-wave laser beam along the surface area and thereby thermally relaxing the surface area to selectively remove compressive surface stress along the surface area without removing substantially any material from the surface area.

2. The method of claim 1 wherein the slider comprises a bearing surface and a back surface and wherein:

the step of directing comprises directing the laser beam toward the back surface; and the step of scanning comprises raster scanning the laser beam over the back surface.

3. The method of claim 1 wherein the slider comprises a bearing surface and a back surface and wherein:

the step of directing comprises directing the laser beam toward the bearing surface; and the step of scanning comprises raster scanning the laser beam over the bearing surface.

4. The method of claim 1 wherein the step of scanning comprises scanning such that the surface area is thermally relaxed in a selected pattern.

* * * * *